(No Model.)

H. C. STALLINGS.
CHECK HOOK.

No. 580,471. Patented Apr. 13, 1897.

Witnesses
Wm. F. Doyle
J. A. Willson

Inventor
Henry C. Stallings
By H. B. Willson,
Attorney

UNITED STATES PATENT OFFICE.

HENRY C. STALLINGS, OF IDAHO FALLS, IDAHO.

CHECK-HOOK.

SPECIFICATION forming part of Letters Patent No. 580,471, dated April 13, 1897.

Application filed July 29, 1896. Serial No. 600,915. (No model.)

*To all whom it may concern:*

Be it known that I, HENRY C. STALLINGS, a citizen of the United States, residing at Idaho Falls, in the county of Bingham and State of Idaho, have invented certain new and useful Improvements in Checkrein-Hooks; and I do declare the following to be a full, clear, and exact description of the invention, such as will enable others skilled in the art to which it appertains to make and use the same.

My invention has relation to improvements in checkrein-hooks for harness, and the object is to provide a simple and effective device of this class whereby the checkrein may be simply and instantly released and as simply secured in such manner as to prevent its accidental release.

To these ends the novelty consists in the construction, combination, and arrangement of the same, as will be hereinafter more fully described, and particularly pointed out in the claim.

In the accompanying drawings the same figures of reference indicate the same parts of the invention.

Figure 1:
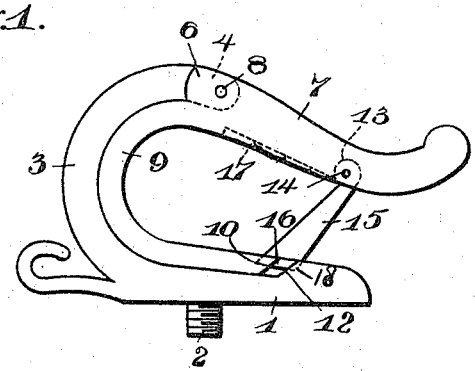
Figure 2:
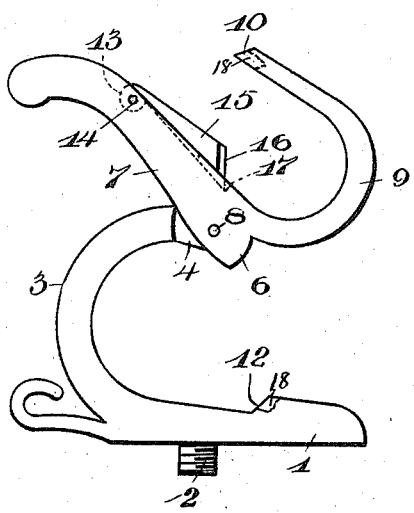
Figure 3:
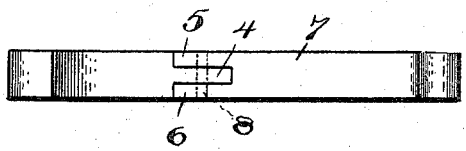

Figure 1 is a side elevation of my improved checkrein-hook, showing the hook closed. Fig. 2 is a similar view showing the hook open and in position to receive the checkrein, and Fig. 3 is a top plan view.

1 represents the body of the stationary hook, which is formed with an integral screw-threaded stud 2, by means of which it is rigidly secured to the back-strap or saddle. The body of this hook is formed with an integral crescent-shaped arm 3, the end of which terminates in a tongue 4, to which is pivoted or hinged the integral lugs 5 6 of the hook 7 by a rivet 8. This hook 7 is formed with an integral curved arm 9, corresponding to the shape of the inner curve of the arm 3 of the body of the hook, and its lower beveled end 10 fits snugly in a correspondingly-shaped recess 12 in the body portion 1, so that the joint is flush at this point. The end of the arm 9 and the shoulder of the recess 12 are formed with a longitudinal groove 18.

Near the forward end and on the under side of the hook 7 is formed a recess 13, in which is hinged by a pivot 14 the upper end of a gravity-pawl 15, the lower beveled end 16 of which is seated in said longitudinal groove 18, closing the joint formed by the beveled end 10 of the arm 9 and the recess 12 in said body portion when the check-hook is closed, as shown in Fig. 1, and when open, as shown in Fig. 2, the pawl lies parallel with the hook in the recess 17, leaving a clear space for the removal and insertion of the checkrein and preventing said rein catching in the beveled end of said pawl. When said rein is inserted in the hook, the parts being in the position shown in Fig. 2, by simply tipping the hook backward the rein slides around in the curved arm 9, which closes the hook 7, and as the strain of the rein is then on said arm 9 forward of its pivotal point 8 it becomes impossible for it to work loose. At the same time the gravity-pawl 15 closes the opening in the hook, and the rein is thus securely held in place against any accidental displacement.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A checkrein-hook comprising the body portion having recess 12 and arm 3, the hook 7 pivoted in said arm and having a beveled end 10, a longitudinal groove 18 formed in the shoulder of the recess 12 and the beveled end 10, and a gravity-pawl 15 pivoted to the arm 9 and having its beveled end 16 seated in said groove 18, substantially as and for the purpose set forth.

In testimony whereof I hereunto affix my signature in presence of two witnesses.

HENRY C. STALLINGS.

Witnesses:
GEORGE CHAPIN,
CHARLES CHAPIN.